United States Patent [19]

Lewis

[11] Patent Number: 5,600,302

[45] Date of Patent: Feb. 4, 1997

[54] VEHICLE-BASED ANTI-LOCKOUT SYSTEM

[76] Inventor: James Lewis, 615 W. Chilton St., Chandler, Ariz. 85224

[21] Appl. No.: 496,426

[22] Filed: Jun. 29, 1995

Related U.S. Application Data

[63] Continuation-in-part of Ser. No. 229,750, Apr. 19, 1994, Pat. No. 5,438,312.

[51] Int. Cl.⁶ .................................................. B60Q 1/00
[52] U.S. Cl. ................... 340/457; 340/457.1; 340/539; 340/542; 307/10.1; 70/263
[58] Field of Search .................... 340/457, 457.1, 340/542, 539, 522; 307/9.1, 10.1; 70/57, 262, 263, 264, DIG. 49

[56] References Cited

U.S. PATENT DOCUMENTS

| | | | |
|---|---|---|---|
| 4,096,468 | 6/1978 | Kopera | 340/457.1 |
| 4,419,712 | 12/1983 | Shimizu | 361/172 |
| 4,428,024 | 1/1984 | Mochida et al. | 361/172 |
| 4,672,375 | 6/1987 | Mochida et al. | 340/825.31 |
| 4,709,777 | 12/1987 | Metz | 180/286 |
| 4,789,851 | 12/1988 | Hoik et al. | 180/286 |
| 4,811,013 | 3/1989 | Akutsn | 340/875.3 |

*Primary Examiner*—Donnie L. Crosland
*Attorney, Agent, or Firm*—Parsons & Goltry; Robert A. Parsons; Michael W. Goltry

[57] ABSTRACT

An electronic system for preventing keys from being locked inside a vehicle. An ignition or door key houses a wireless transmitter which can send a signal to lock or unlock the vehicle doors. As a driver approaches a locked car, the unlock button on the transmitter is pressed, thereby unlocking the doors. Upon exiting the vehicle, a driver may inadvertently lock himself out of the vehicle if the doors are manually locked when the door key is inadvertently left somewhere inside the car. To prevent lock-out, an oscillating unlock signal is automatically output to the electronic door locks. Simultaneously an alarm sounds to alert the driver that the keys are still in the car. The driver returns to the vehicle, opens the doors which have been automatically unlocked, and retrieves the keys. Upon retrieval of the keys, the driver again exits the vehicle, locks the doors manually or electronically, and presses the lock button to stop the alarm and end the transmission of the oscillating unlock signal.

16 Claims, 3 Drawing Sheets

VEHICLE-BASED ANTI-LOCKOUT SYSTEM

This is a continuation-in-part of application Ser. No. 08/229,750 filed Apr. 19, 1994 now U.S. Pat. No. 5,438,312.

BACKGROUND OF THE INVENTION

This invention relates generally to a system that prevents keys from inadvertently being locked in a vehicle. More particularly this invention relates to an electronic system in which an alarm sounds and vehicle doors automatically unlock when the keys have been left anywhere inside the vehicle.

To the chagrin of automobile drivers, it is easy to lock ignition and door keys in a vehicle, thus locking the driver out. This occurs when the driver leaves the keys in the car, exits the car, and locks the doors without a key by manually manipulating the latch or electronically engaging the locks. While most drivers find this embarrassing and annoying, locking the keys in the car can also be dangerous if a small child or animal is locked inside.

For safety reasons, young children are often strapped into a safety seat for travel. It is likely that the child does not know how to unlatch the safety seat belts or is not dexterous enough to do it. Similarly such a child may not be able to unlock a car door from the inside, even if not strapped into a safety seat. If a driver inadvertently locks the car keys in the car while the child is inside, a precarious situation arises. The child can't get out and the driver can't get in.

As is often the case, drivers with small children may drive a van or station wagon. A common scene is to finish shopping and return to the car with groceries and a child. Before loading the groceries, the passenger compartment is unlocked with the keys and the child is placed in the car seat. The driver then goes to the trunk or rear of the van to load the groceries. The rear door is opened and because the driver wants to use two hands to load, the car keys are set down in the car. After the groceries are loaded, the driver slams the trunk or door tightly for security, locking the door by habit, only to realize in horror that the groceries, child and keys are now securely locked in the car.

A similar situation may arise if an animal is in the car when the driver exits the vehicle and inadvertently locks the keys in the car. Moreover, even if the driver leaves the doors unlocked, an active animal may inadvertently lock the doors by stepping on the door lock button or plunger, thereby locking itself in the car.

Aside from the embarrassment to the driver, and the subsequent expense and wasted time to call for police or a locksmith to unlock the door, the safety of the child or animal can become of great concern. If the vehicle is turned off, as is normally the case when keys are locked in the car, the interior environment of the vehicle is not controlled. In desert areas, the interior temperature of a closed vehicle can reach 140 degrees in a matter of minutes. Likewise in cold areas, the interior temperature can drop to sub-freezing temperatures in a very short time. These temperature extremes can be life-threatening to humans and animals locked in the car.

The prior art has endeavored to create devices which prevent car keys from being locked in a car, generally known as anti-lockout devices. However, these devices were not created to prevent life-threatening conditions to vehicle occupants. Instead they were developed to alert the driver that the ignition keys were still in the ignition upon the driver's exit and, if not retrieved, to disable the locking mechanisms. U.S. Pat. Nos. 55 4,709,777, 4,789,851, 4,428,024 and 4,419,712 describe variations on an electronic door lock interlock which senses the presence of a key in the ignition. When the key is in the ignition and the driver attempts to lock the doors, an alarm sounds and the locking mechanism is disabled. These devices work as anti-lockout devices only if the key has been left in the ignition. A driver would be locked out if the keys were left anywhere else in the car but the ignition, like the floor, on the seat, or in the trunk.

Instead of unlocking the car doors automatically when the keys have been left inside, other prior art inventions for keyless entry systems automatically lock the doors to prevent theft of the vehicle or its contents. These devices do not prevent or solve the situation where a child is locked in a car and, in fact, aggravate it. Keyless entry systems do not require keys to operate door locks, and use remote control technology to electronically operate door locks and the like. Instead of a key to insert in a mechanical lock, the driver carries a transmitter to signal the locks to engage electronically. Anti-lockout devices have been designed into this wireless technology so that if a transmitter is locked in the car, the driver may still enter with a key or by entering a preset code. For example, U.S. Pat. No. 4,672,375 describes a keyless entry system that alerts the driver if the transmitter has been left in the car. If the driver does not retrieve the transmitter, the doors automatically lock, the keyless entry system is disabled, and the car can be entered only with a key.

Anti-lock devices are well known in the prior art. However, until now, these devices served to alert the driver only if the key has been left in the ignition. If the keys are removed from the ignition, but still left somewhere in the car, the prior art devices are ineffective. Therefore, it is an object of this invention to overcome the problems of prior art and provide an anti-lockout system which will prevent the doors from locking if the keys have been left in the car, regardless of their location within the car. It is a further object of this invention to enable a driver to re-enter the car to retrieve the car keys if they have been left in the car. It is a further object of this invention to provide a system which will alert the driver that the keys have been left in the car so that the keys can be retrieved and the doors locked.

BRIEF SUMMARY OF THE INVENTION

This patent discloses an electronic system for preventing keys from being locked inside a vehicle. A vehicle key is attached to a wireless transmitter which can send a signal to lock or unlock the vehicle doors. To enter a car normally, a driver approaches a locked car and presses the unlock button on the transmitter, which in turn unlocks the doors. To exit a car normally, the driver exits the car with keys in hand, and locks the doors by transmitting a lock signal or otherwise engaging the locks.

However, a driver may inadvertently lock himself out of the vehicle if he exits and locks the doors manually when the key is inadvertently left somewhere inside the car. To prevent lock-out in such a situation, an oscillating unlock signal is automatically output to the electronic door locks as soon as the driver's seat belt is unbuckled and a door is closed. After a few seconds delay, if the lock button on the transmitter is not pressed, an alarm sounds to alert the driver that the keys are still in the car. The driver may then return to the vehicle, open the doors which have automatically been kept unlocked, and retrieve the keys. Upon retrieval of the keys, the driver again exits the vehicle, locks the doors manually or electronically, and presses the lock button to stop the alarm and end the output of the oscillating unlock signal. The car is secured and the driver has the keys in hand.

DESCRIPTION OF THE PREFERRED EMBODIMENTS

Figure 1:
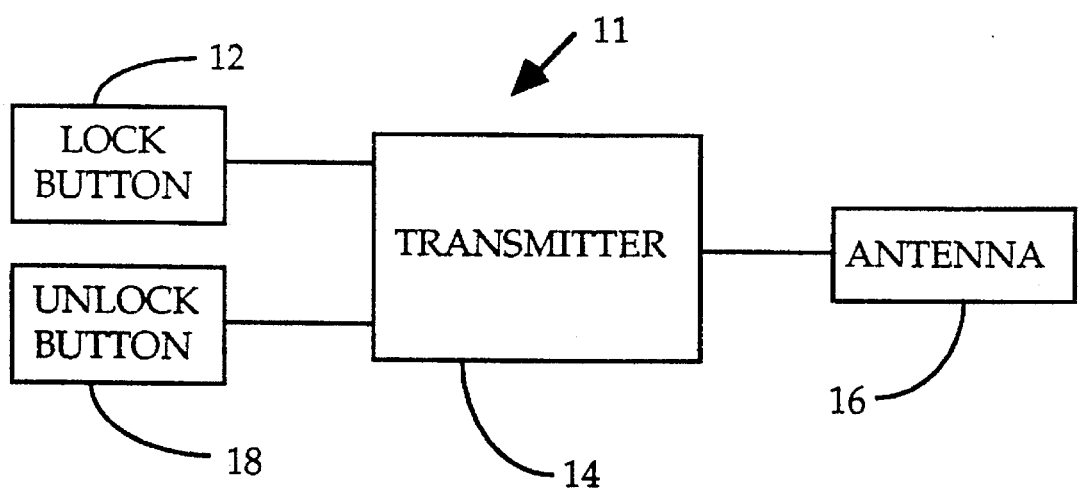
FIG. 1 is a block diagram showing the general circuit arrangement of the transmitter.

Referring now to the accompanying drawings, FIG. 1 illustrates the transmitter circuitry. Preferably the transmitting/receiving process is based on standard radio frequency remote control technology, commonly known in the prior art, with improvements that implement the invention. FIG. 1 illustrates the transmitter circuitry 11 for the present invention. A lock button 12 is depressed to instruct a transmitter 14 to transmit a signal to a remote receiver to lock the doors. An unlock button 18 is depressed to instruct the transmitter 14 to transmit a signal to the remote receiver to unlock the doors. An antenna 16 may be employed for signal transmission. The transmitter 14 generates the appropriate signal and the antenna 16 emits it. The same button may be used to transmit both signals, depending on the circuitry used for the lock/unlock button which is known in the art. The transmitter circuitry 11 can be housed in a key holder separate from the keys of the car, but still attached to them. U.S. Pat. No. 5,220,319 describes such a key holder for a remote control transmitter.

Discrete circuits may be used for the transmitter circuitry 11, but it would be advantageous to add the necessary circuitry to an existing microcontroller or application specific integrated circuit (ASIC), as the transmitter housing should be quite small. Other possible embodiments of the transmission circuitry 11 such as a programmable logic device (PLD) or a field programmable gate array (FPGA) would be recognized by those skilled in the art. The transmission is powered by a battery, preferably a lithium or NiCad battery, known for their small size and long life.

Figure 2:
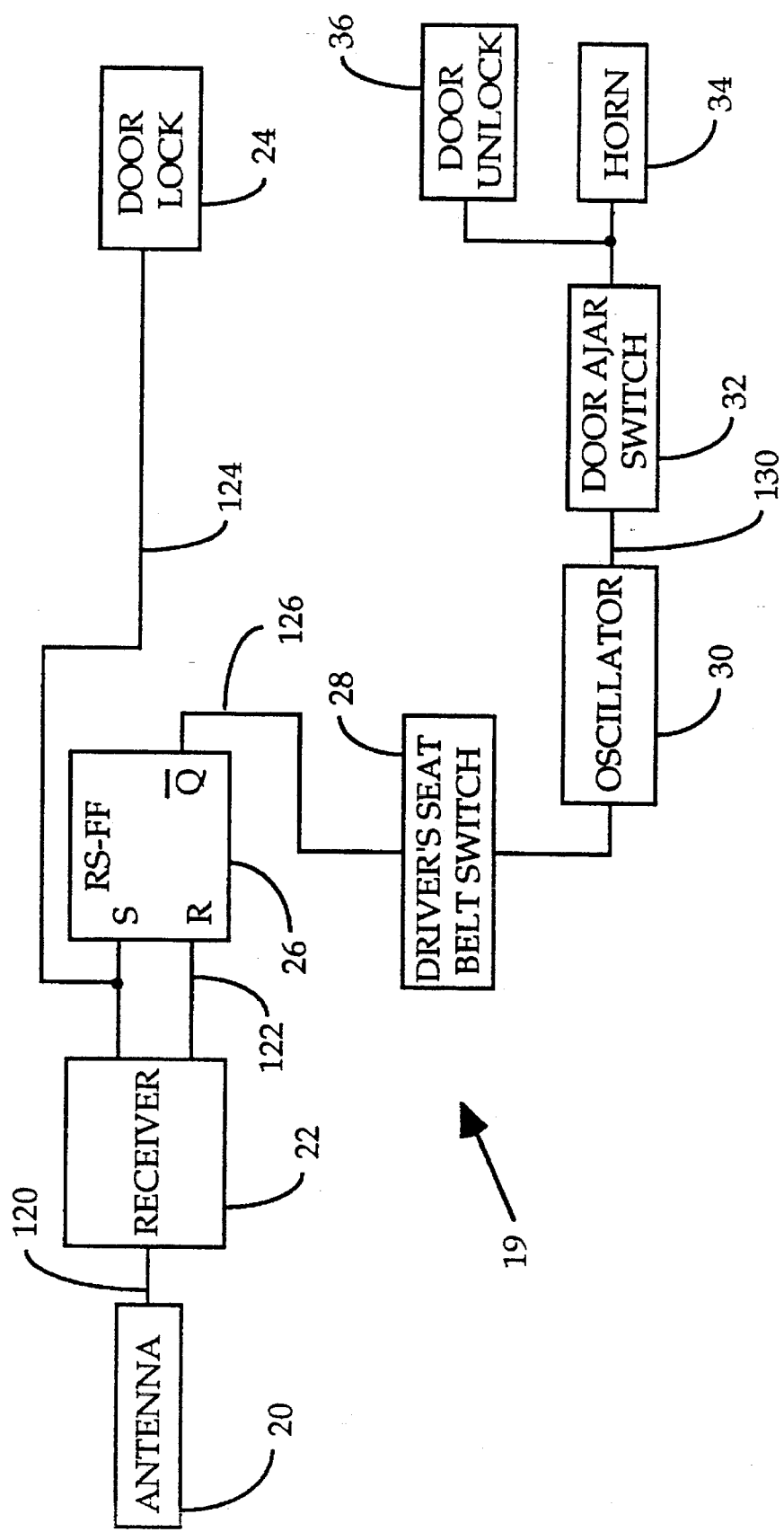
FIG. 2 is a block diagram showing the general circuit arrangement of the vehicle-mounted receiver.

FIG. 2 shows the general circuit arrangement of the preferred embodiment of the vehicle-mounted section of the present invention or receiver circuitry 19. The receiver circuitry 19 is based on standard remote control and electronic door lock technology, known commercially, with improvements that implement the invention. A receiver 22 receives a signal 120, either lock or unlock, and outputs a second lock 124 or a second unlock 122 signal, respectively. An antenna 20 may be used for signal reception.

A latch or memory element 26 stores the state or status of the receiver circuitry 19 as either false (e.g. locked) or true (e.g. unlocked). The state of the memory element 26 is determined by the second lock signal 124 and second unlock 122 signals output by the receiver 22. A standard door lock mechanism 24 is activated and the memory element 26 is set to false when the second lock signal 124 is output. The memory element 26 is set to true when the second unlock signal 122 is output by the receiver. The latch 26 shown in FIG. 2 is preferably a reset-set flip-flop (referred to as RS-FF), but those skilled in the art will recognize other embodiments for it, such as an SC, D- or JK flip-flop, a register in a microprocessor, or logic gates. The output 126 of the latch 26 becomes active when the state is true.

An oscillator 30 generates an oscillating unlock signal 130 when the output of the latch becomes active. The driver's presence in the car is tested via a driver's seat belt switch 28. Preferably, when the seat belt is buckled (indicating the driver's presence in the car), the driver's seat belt switch 28 is open and the oscillating unlock signal 130 is inhibited. However, if the seat belt is unbuckled, the driver's seat belt switch 28 is closed and the oscillating unlock signal 130 activates a standard door unlock mechanism 36 and the vehicle horn 34 or other audible alarm mechanism.

Preferably, a door ajar switch 32 is interposed between the latch 26 and the horn 34 and door unlock mechanism 36. The door ajar switch 32 allows the driver to unlock the vehicle and open the door (e.g. while loading groceries in the vehicle) without repeatedly sounding the horn 34 and unlocking the doors 36. The preferred embodiment of FIG. 2 shows the driver's seat belt switch 28 connected between the latch 26 and oscillator 30 and shows the door ajar switch 32 connected between the oscillator 30 and the horn 34 and door unlock mechanism 36. However, the switches 28 and 32 may be connected in any location after the latch 26 to inhibit the oscillator 30 from outputting the oscillating unlock signal 130. When the state of the memory element 26 is true, the doors are closed, and the driver's seat belt is unbuckled, the oscillator 30 outputs the oscillating unlock signal 130 with a duty cycle to remind the driver every few seconds to press the lock button 12.

Figure 3:
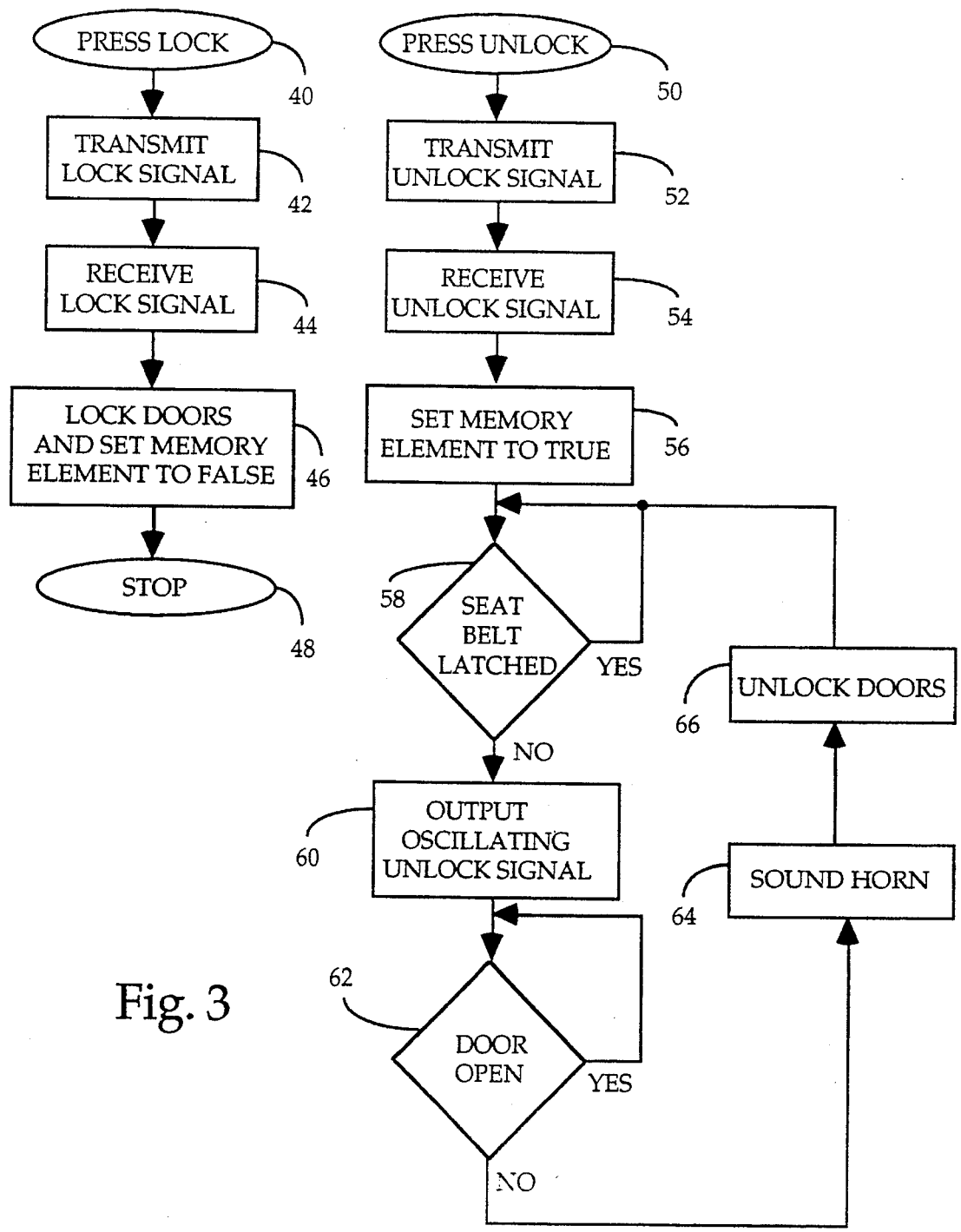
FIG. 3 is a flow chart of the present invention.

FIG. 3 illustrates the method embodied by this invention for preventing keys from being locked in a vehicle. The system is at rest 48 (in a stable state) only after the lock button has been depressed 40, the lock signal is transmitted 42, the lock signal is received 44, and the doors are locked and the memory element is set to false 46.

When the unlock button is depressed 150, the system is in a constantly unstable state. First, the unlock signal is transmitted 52 and received 54 and the memory element is set to true. If the seat belt is not buckled 58 the oscillator will continually output an oscillating unlock signal 60. If the door is closed 62 the horn will also be sounded 64 and the doors will be unlocked 66. The unstable unlocked state prevents the driver from leaving the key in the vehicle and manually locking the doors, by repeatedly unlocking the doors and sounding the horn to alert the driver to retrieve the key. The unstable unlocked state distinguishes this invention from the prior art because no affirmative action such as pressing an automatic door lock button is required to alert the driver. An affirmative action (i.e. pressing the lock button 12 on the transmitter circuitry 10) is required to prevent the system from alerting the driver. This improves safety by requiring the driver to retrieve the key from the vehicle before locking it, thus allowing the driver to always be able to unlock the vehicle when needed.

The improvements embodied by this invention relate to the process of unlocking vehicle doors. In this invention, the unlock signal output by the oscillator is an oscillating duty cycle, whereby the doors are repeatedly unlocked and the horn repeatedly sounded until the unlock signal is stopped by one of several actions. This process requires not only an affirmative action to lock the doors, but enables the unlock signal until it, too, is affirmatively stopped. This combination of actions prevents the keys attached to the transmitter circuitry from being locked in the car. These objectives are achieved with the anti-lockout system described above and in the accompanying drawings. Variations and modifications which are in the spirit of this invention are considered to fall within the scope of this patent.

I claim:

1. A method for preventing keys from being locked in a vehicle comprising:

transmitting a first lock signal;

receiving the first lock signal and outputting a second lock signal;

locking at least one door of a vehicle when the second lock signal is received;

transmitting a first unlock signal;

receiving the first unlock signal and outputting an oscillating unlock signal;

inhibiting the oscillating unlock signal when a driver's seat belt is buckled;

inhibiting the oscillating unlock signal when at least one door of the vehicle is open;

sounding an audible warning when the oscillating unlock signal is output;

unlocking at least one door of the vehicle when the oscillating unlock signal is output;

whereby at least one door of a vehicle is unlocked and the audible warning is sounded when the seat belt is unbuckled and the doors of the vehicle are closed.

2. A method according to claim 1 wherein the transmitted first unlock signal and first lock signal are of radio frequency.

3. The method according to claim 1 wherein the audible warning is sounded after a preset delay period.

4. The method according to claim 1 wherein the audible warning is a vehicle's horn.

5. The method according to claim 1 in which the first lock signal is transmitted by depressing a lock button attached to a vehicle ignition key; and the first unlock signal is transmitted by depressing an unlock button attached to the vehicle ignition key.

6. The method according to claim 5 wherein the output of the oscillating unlock signal is stopped by pressing the lock button attached to the vehicle ignition key.

7. A method for preventing keys from being locked in a vehicle comprising:

transmitting a first lock signal;

receiving the first lock signal and outputting a lock signal;

locking at least one door of a vehicle when the lock signal is received;

transmitting a first unlock signal;

receiving the first unlock signal and outputting an oscillating unlock signal;

inhibiting the oscillating unlock signal when a driver's seat belt is buckled;

inhibiting the oscillating unlock signal when at least one door of the vehicle is open;

sounding an audible warning when the oscillating unlock signal is output;

unlocking at least one door of the vehicle when the oscillating unlock signal is output;

whereby at least one door of a vehicle is unlocked and the audible warning is sounded when the seat belt is unbuckled and the doors of the vehicle are closed.

8. A method for preventing keys from being locked in a vehicle comprising:

depressing a lock button attached to a vehicle ignition key when at least one door of a vehicle is to be locked;

transmitting a first lock signal from the electronic circuit, when the lock button is depressed;

receiving the first lock signal with a receiver when the first lock signal is transmitted;

setting a memory element to false and locking at least one door of the vehicle when the first lock signal is received;

depressing an unlock button attached to the vehicle ignition key when at least one door of the vehicle is to be unlocked;

transmitting a first unlock signal from the electronic circuit, when the unlock button is depressed;

receiving the first unlock signal with the receiver when the first unlock signal is transmitted setting the memory element to true when the first unlock signal is received;

outputting an oscillating unlock signal from an oscillator when the memory element is true;

inhibiting the oscillating unlock signal when a driver's seat belt is buckled by using a driver's seat belt switch connected to the oscillator;

inhibiting the oscillating unlock signal when at least one door of the vehicle is open by using a door ajar switch connected to the oscillator;

sounding an audible warning when the oscillating unlock signal is output;

unlocking at least one door of the vehicle when the second oscillating unlock signal is output;

whereby at least one door of the vehicle is unlocked and the audible warning is sounded when a driver unbuckles the driver's seat belt, leaves the vehicle without depressing the lock button on the ignition key, and at least one door of the vehicle is closed.

9. The method according to claim 8 wherein the first unlock signal and the first lock signal are transmitted at radio frequency.

10. The method according to claim 8 wherein the sounding of the audible alarm occurs after a preset delay period.

11. The method according to claim 8 wherein the audible alarm is a vehicle's horn.

12. The method according to claim 8 wherein the memory element further comprises a latch, a set terminal of which is connected to the receiver and is activated when the first lock signal is received, a reset terminal is connected to the receiver and is activated when the first unlock signal is received, and an inverted output is connected to the oscillator and is activated from whenever the reset terminal is activated until the reset terminal is activated.

13. A method for preventing keys from being locked in a vehicle comprising:

transmitting a lock signal;

receiving the lock signal;

locking at least one door of the vehicle;

transmitting an unlock signal;

receiving the unlock signal outputting an oscillating unlock signal;

inhibiting the oscillating unlock signal when a driver is seated in the vehicle;

inhibiting the oscillating unlock signal when at least one door of the vehicle is open;

sounding an audible warning when the oscillating unlock signal is output;

unlocking at least one door of the vehicle when the oscillating unlock signal is output;

whereby at least one door of a vehicle is unlocked and the audible warning is sounded when the seat belt is unbuckled and tat least one door of the vehicle is closed.

14. An apparatus for preventing keys from being locked in a vehicle comprising:

a transmitter having a lock button and an unlock button, the transmitter transmitting a first lock signal when the lock button is pressed and transmitting a first unlock signal when the unlock button is pressed;

a receiver receiving the first lock signal and the first unlock signal from the transmitter, the receiver outputting a second lock signal when the first lock signal is received and outputting a second unlock signal when the first unlock signal is received;

a memory element electrically connected to the receiver, the memory element being true after the second unlock signal is output and being false after the second lock signal is output;

an oscillator electrically connected to the memory element, the oscillator outputting an oscillating unlock signal when the memory element is true;

a first switch inhibiting the oscillating unlock signal when a driver's seat belt is fastened;

a second switch inhibiting the oscillating unlock signal when at least one door of the vehicle is open;

whereby the doors of the vehicle are locked when the second lock signal is output, and an audible warning is sounded and at least one door of the vehicle is unlocked when the oscillating unlock signal is output, the driver's seat belt is unbuckled, and the doors of the vehicle are closed.

15. The apparatus according to claim 14 further comprising a first antenna electrically connected to the transmitter and a second antenna electrically connected to the receiver.

16. An apparatus for preventing keys from being locked in a vehicle comprising:

a transmitter having a lock button and an unlock button, the transmitter transmitting a lock signal when the lock button is pressed and transmitting a unlock signal when the unlock button is pressed;

a receiver receiving the lock signal and the unlock signal;

a memory element electrically connected to the receiver, the receiver setting the memory element to true after the unlock signal is received and setting the memory element to false after the lock signal is received;

an oscillator electrically connected to the memory element, the oscillator outputting an oscillating signal when the memory element is true;

a first switch inhibiting the oscillating signal when a driver is seated in the vehicle;

a second switch inhibiting the oscillating signal when at least one door of the vehicle is open;

whereby the doors of the vehicle are locked when the lock signal is received, and an audible warning is sounded and at least one door of the vehicle is unlocked when the oscillating signal is output, the driver's seat belt is unbuckled, and the doors of the vehicle are closed.

\* \* \* \* \*